Figure 3:
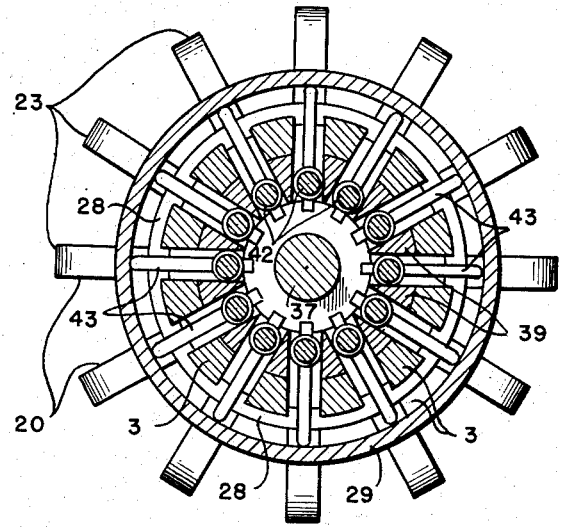

Nov. 30, 1954     I. S. ROBERTS     2,695,456
CALIPER
Filed Oct. 27, 1950     4 Sheets-Sheet 1
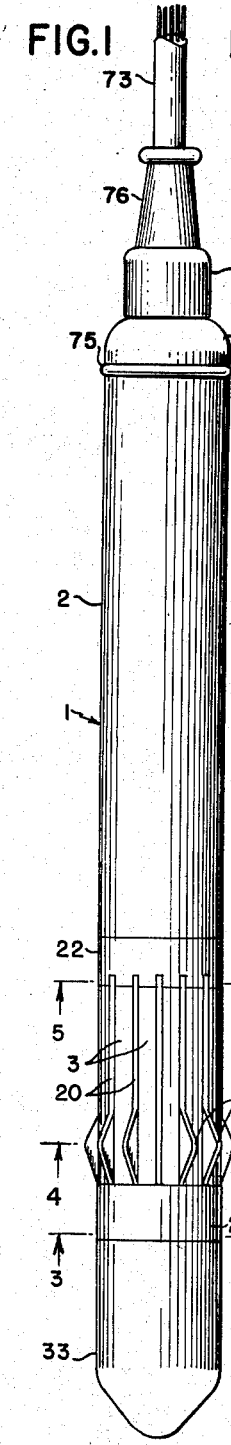
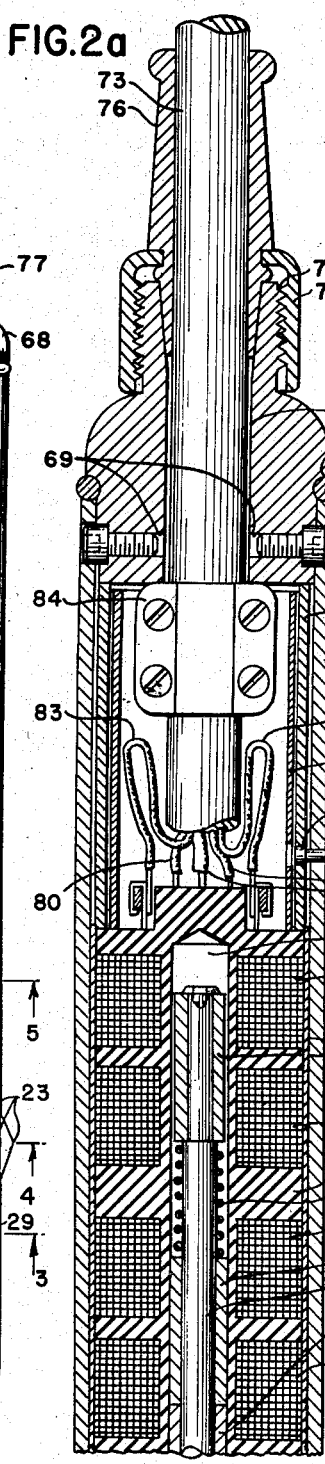
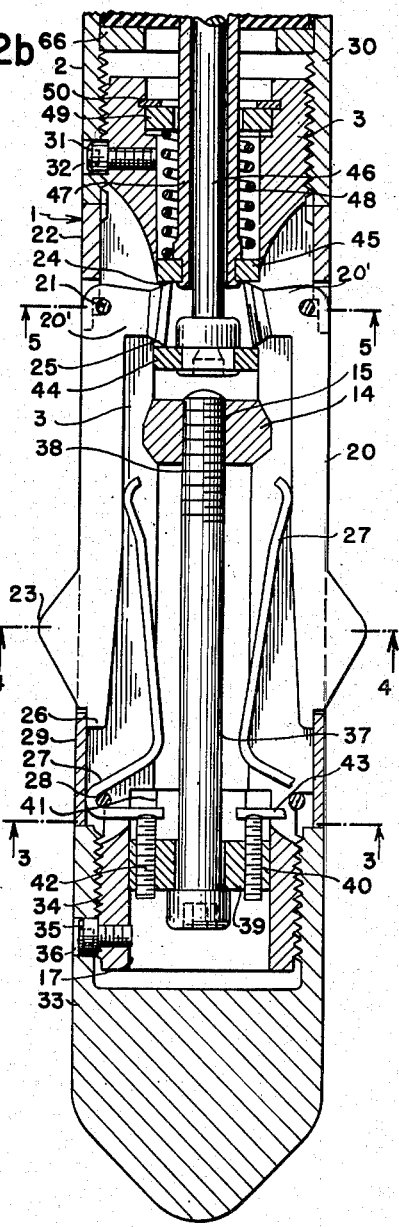
*INVENTOR.*
Ingham S. Roberts
BY
*Adams, Forward and McLean*
ATTORNEYS Nov. 30, 1954  I. S. ROBERTS  2,695,456
CALIPER Filed Oct. 27, 1950  4 Sheets-Sheet 2

INVENTOR.
Ingham S. Roberts
BY
Adams, Forward and McLean
ATTORNEYS

Nov. 30, 1954 — I. S. ROBERTS — 2,695,456
CALIPER
Filed Oct. 27, 1950 — 4 Sheets-Sheet 3

INVENTOR
Ingham S. Roberts
BY Adams, Forward & McLean
ATTORNEYS

Nov. 30, 1954  I. S. ROBERTS  2,695,456
CALIPER

Filed Oct. 27, 1950  4 Sheets-Sheet 4

INVENTOR.
BY Ingham S. Roberts

Adams, Forward and McLean
ATTORNEYS

United States Patent Office

2,695,456
Patented Nov. 30, 1954

2,695,456
CALIPER

Ingham S. Roberts, Ridley Park, Pa.

Application October 27, 1950, Serial No. 192,550

3 Claims. (Cl. 33—178)

I have invented an improved caliper adapted to the measurement of the maximum and minimum internal transverse dimensions of long conduits by passage therethrough, capable of providing a continuous indication of such measurements whether through horizontal, vertical, or inclined conduits and further adapted to the measurement of the depth and location of thin spots and the thickness of scale formation on the walls of such conduits. Further advantages and adaptations of my caliper will become evident later. The apparatus of my invention is particularly adapted to the measurement of boiler tubes, refinery tubing, oil well casing and the like.

Particular reference is made to my U. S. Patent No. 2,235,533, patented March 18, 1941, describing an electrical tube caliper. The present caliper employs a means similar to that employed in the caliper of my patent for translating radial motion of a caliper finger into a change in the electrical characteristics of an element located within the caliper head, which change may be indicated or recorded in a manner similar to that described in the said patent.

My present caliper comprises an elongated cylindrical measuring head adapted to passage through long conduits. Four or more caliper fingers are pivotally mounted, advantageously at approximately equal arcuate intervals, about the circumference of the measuring head and are adapted to independent radial movement. Independent springing means urge each such finger to contact the walls of the conduit to be measured. A second springing means is provided which causes the measuring head to be positioned centrally within the circle determined by the 3 most depressed fingers, that is, causes the three most depressed fingers to be equally depressed. The least depressed finger is operatively connected in a manner to cause a variation in a measurable electrical characteristic of an element located within the measuring head correspondingly responsive to the movement of such least depressed finger. In one embodiment of my invention the most depressed fingers also may be operatively connected in a manner to cause a variation in a measurable electrical characteristic of a second element located within the measuring head correspondingly responsive to the movement of such most depressed fingers. The variations in the electrical characteristics of such elements are conveniently measured by the inclusion of such elements in electrical bridge circiuts or other electrical measuring circuits, conveniently located without the conduit and connected with the said elements within the caliper by insulated electrical cable.

I have found it advantageous to use variable inductances such as solenoids as such elements. By the inclusion of such variable inductances or solenoids in impedance bridge circuits, through which alternating current is passed, the variations of the movable fingers may be measured as variations in a voltage indication across the impedance bridge or may be recorded by a device actuated by such voltage variations.

Thus, my caliper is adapted to the measurement of non-circular cross sections in conduits occurring where, for example, scale has formed or the wall of the tube is pitted or worn thin. In such cases, the indication determined by the least depressed finger will be of the maximum internal transverse measurement, and, if the most depressed fingers are also operatively connected, as described, an indication of the minimum internal transverse measurement will be available. When this information is compared with known outside diameters of the tube conduits or casings, available information will be had showing the thickness of the wall and location and thickness or depth of scale or pits.

While at least 4 movable caliper fingers will give an indication of both maximum and minimum internal transverse measurements, I have found it particularly advantageous to employ from 6 to 18 of such fingers in order to promote better centering of the measuring head with respect to the 3 most depressed fingers, particularly when the caliper is to be passed through a horizontal tube, and in order to provide a sufficient number of fingers spaced about the conduit to locate scale or worn spots on its inner surface which may extend through only a small arc of such surface.

Figure 4:
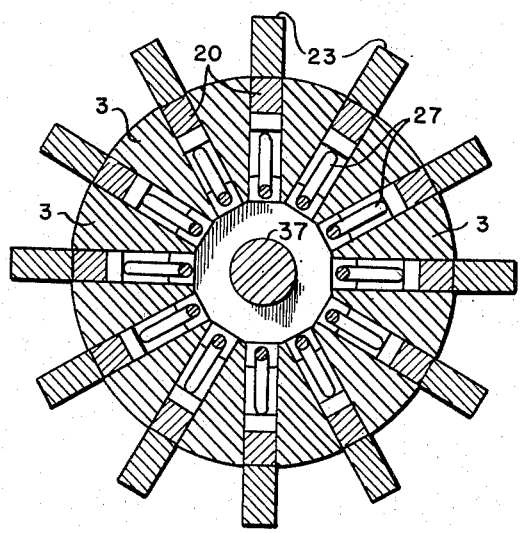
Figure 5:
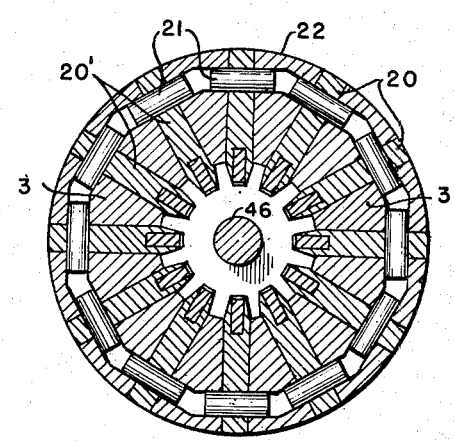
Figure 7:
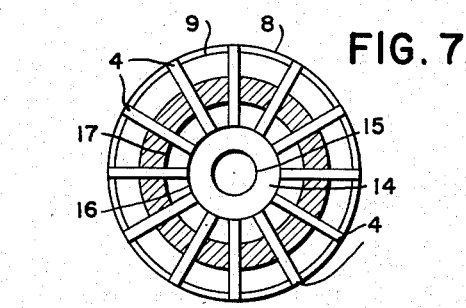
Figure 8:
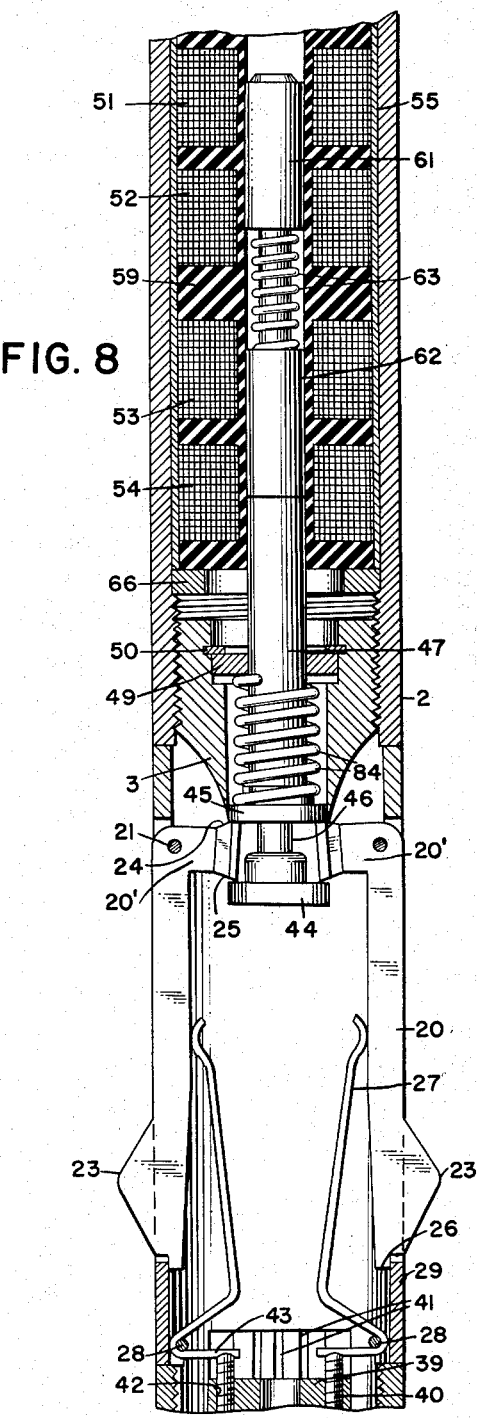
Figure 6:
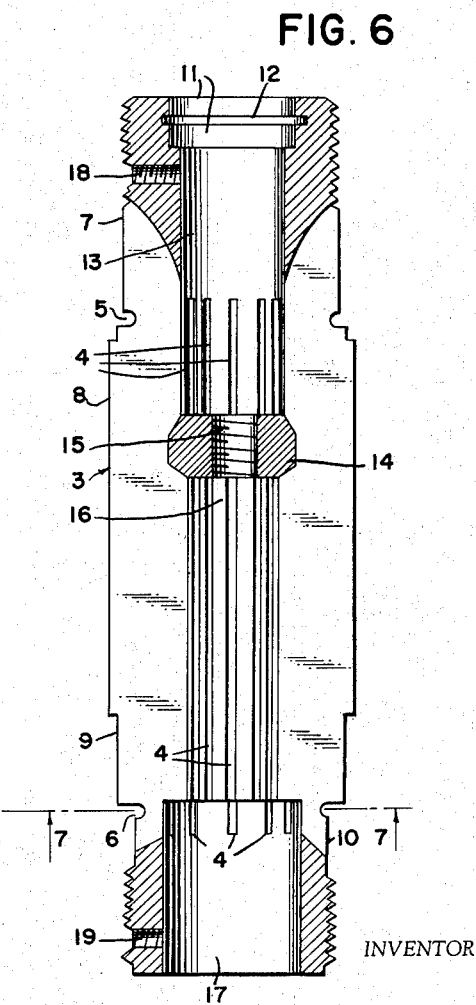
Figure 9:
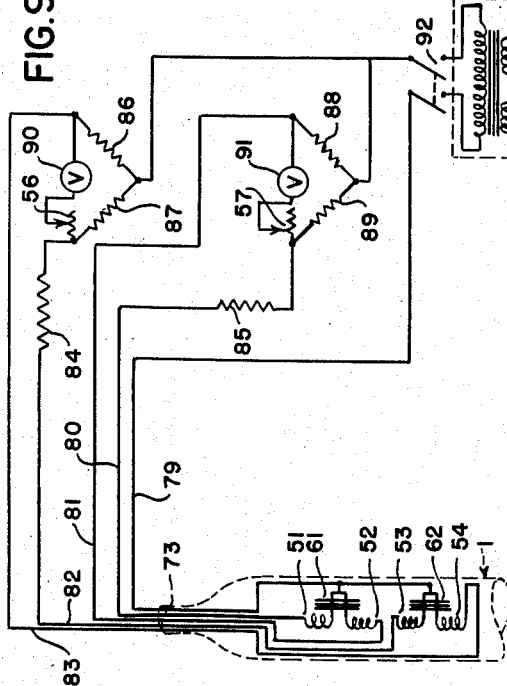

Figure 1 shows in elevation the assembly of one embodiment of my invention which is particularly suitable to measurement of both the maximum and minimum internal transverse measurements of narrow tubes and conduits. Figure 2 shows a vertical midsectional view of the caliper shown in Figure 1 and for convenience is illustrated with twice the scale size used in Figure 1. Figures 3, 4, and 5 show cross-sectional views of the caliper in Figure 1 with 3 times the scale size of Figure 1 taken at lines 3—3, 4—4, and 5—5 respectively. Figure 6 shows in sectional elevation a particular part of the same caliper with the same scale size as Figure 2. Figure 7 is a cross-sectional view of the part in Figure 6 taken at line 7—7 in Figure 6. Figure 8 is a simplified drawing showing the cooperation between the moving parts of the caliper by which the radial movement of the fingers is translated into a variation in electrical characteristics of elements located within the caliper. The non-moving parts are shown in Figure 8 in a cross sectional manner as in Figure 2. Figure 9 schematically shows the electrical circuit by which the caliper measurements may be indicated as a voltage.

Figure 11:
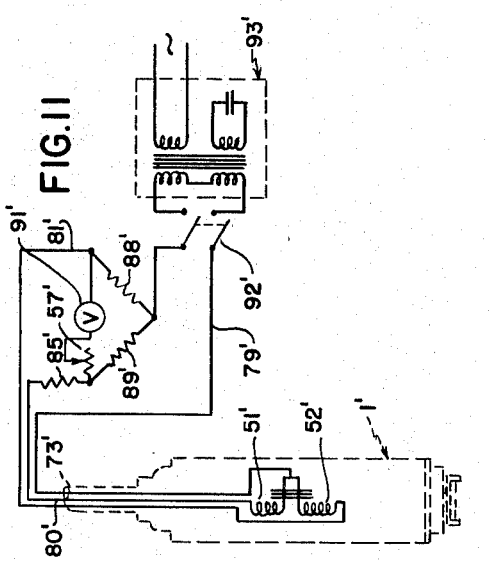
Figure 10:
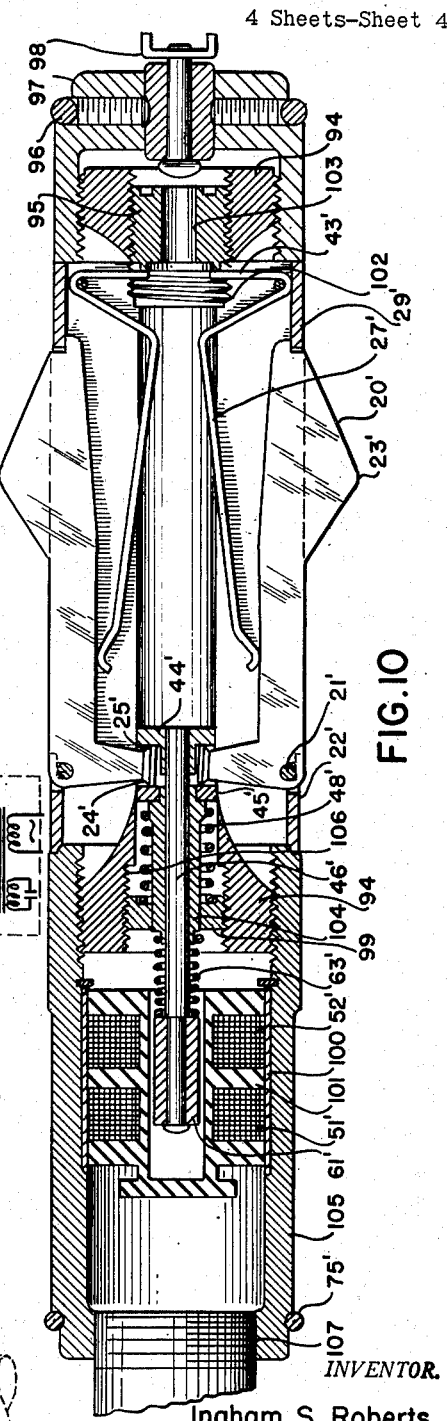

Figure 10 shows a horizontal sectional view of a second embodiment of my caliper specifically adapted to indicate only the maximum internal transverse dimension of narrow tubes and conduits, as determined by the position of the least depressed finger. Figure 11 is a schematic electrical diagram showing a method by which the measurements determined by the caliper in Figure 10 may be indicated as voltage.

Referring to that embodiment of my invention shown in Figures 1–9, the reference numeral 1 indicates the assembled caliper. The caliper casing comprises an elongated cylindrical shell 2 within which are located the electrical components of caliper 1, and finger housing 3 within which are located most of the moving parts of the caliper 1.

Figures 6 and 7 show in detail the structure of finger housing 3 which is generally cylindrical in shape comprising four adjacent coaxial cylindrical surfaces 7, 8, 9 and 10, as illustrated. Surfaces 7 and 8 are separated by circumferential groove 5, and surfaces 9 and 10 are likewise separated by circumferential groove 6. Substantially all of surface 10 and the outer end of surface 7 are threaded.

Finger housing 3 is provided with radial slots 4, 12 such slots are shown in this embodiment. Slots 4 extend lengthwise substantially throughout the unthreaded portion of surfaces 7, 8 and 9 and extend inwardly from such surfaces with substantially unvarying width, being shorter in length as they approach the center of the housing. The center of finger housing 3 is completely open having hole 11 at one end which is provided with a slot 12 completely around its surface. Hole 11 extends in a somewhat narrower diameter into bore 13. At 14 member 3 is annularly solid having tapped hole 15 through its center. Hole 15 enters into bore 16 which is of approximately the same diameter as bore 13. Bore 16 opens into end hole 17 of substantially greater diameter. Tapped holes 18 and 19 are provided.

Fingers 20 are mounted pivotally on pins 21 which rest in circumferential groove 6 and are retained in place by circumferential sleeve 22. Fingers 20 are provided with bearing surfaces 23 which may be roller bearings or contact surfaces of tungsten carbide. The bearing surfaces 23 project outwardly from the general contour of the caliper and provide a minimum surface contact with the walls of the tube through which the caliper is to be passed. Fingers 20 are further provided with arms 20' extending inwardly and carrying hardened bearing surfaces 24 and 25 and are provided with stops 26, all of which are preferably formed as an integral part of the fingers 20.

Each finger is urged outwardly by bent spring 27 which is pivoted on clip ring 28 resting in circumferential groove 5 of member 3. The pivoting assembly is held in place by circumferential sleeve 29 which also acts to arrest the outward motion of fingers 20 by contact with stops 26.

Threaded end 7 of the finger housing 3 is engaged with tapped end 30 of housing 2 and securely held in place by set screw 31 which enters housing 2 through hole 32 and engages with tapped hole 18 in housing 3. End cap 33 engages the threaded end 10 of member 3 with its tapped portion 34 and is securely held in position by set screw 35 which enters end cap 33 through hole 36 and engages tapped hole 19 of member 3. End cap 33 also holds in position circumferential member 29 which slips over surface 9 of housing 3 in such a manner that assembled members 2, 22, 3, 29, and 33 present a substantially smooth cylindrical surface over the length of the caliper which is interrupted only by the projecting bearing surfaces 23 of fingers 20.

Fingers 20 are of such thickness as to fit closely within slots 4 and yet being readily free to move radially, each finger being at least wide enough so that springs 27 are forced to engage with fingers 20. Bolt 37, which is provided with a threaded end 38, holds in place collar 39, threaded end 38 being engaged with tapped hole 15 of member 3. Collar 39 is a cylindrical annulus having tapped holes 40 and slots 41 which are so positioned that, when member 39 is placed in hole 17 of member 3, the holes 40 and slots 41 can be aligned with slots 4 of member 3. Set screws 42 are engaged in holes 40 and further engage with free ends 43 of springs 27 in such a manner that screws 42 may be used to adjust the tension placed on fingers 20 by spring 27. Preferably, the tension placed on each finger should be the same. Tension adjustment may be equally applied to all springs 27 by tightening or loosening the adjustment of bolt 37.

Bearing surfaces 25 of fingers 20 bear against annular disk 44, and bearing surfaces 24 of fingers 20 bear against annular disk 45. Disks 44 and 45 are positioned within passage 13 of member 3, and are integrally part of rod 46 and plunger 47, respectively. Rod 46 extends through the center of the caliper towards its upper end, and plunger 47 extends towards the upper end of the caliper as a coaxial sleeve about rod 46.

Heavy helical spring 48, also lying in passage 13 of member 3, is held in place by annular disk 49. Retaining ring 50 fits in slot 12 of member 3 and prevents upward motion of annular disk 49, the latter being positioned in hole 11 of member 3. Disk 49 is prevented from moving downward by the narrowing of hole 11 into bore 13. Spring 48 preferably is strong enough to support the weight of caliper 1 when placed in horizontal position resting on one or more of fingers 20, and further is of sufficient strength to force a centering of caliper when passed through a conduit, by causing the three most depressed fingers 20 to be equally depressed.

Plunger 47 and rod 46 must be made of a non-magnetic substance. Within housing 2 are contained 4 solenoid coils 51, 52, 53, and 54 located coaxially with the longitudinal axis of the caliper. Coils 51, 52, 53, and 54 are encased within block 59 of insulating material which contains a central open bore 60 extending through the open centers of the coils to admit the extensions and associated parts of rod 46 and plunger 47. Coils 51, 52, 53, and 54 at their outer circumferences are encased by iron or steel sleeve 55, which shields the magnetic fields of the coils from extraneous influences.

Within the bore 60 of block 59 rod 46 extends, and to its upper extremity is affixed sleeve 61 which is positioned midway between the coil 51 and 52 when caliper fingers 20 are extended to their outmost position. Plunger 47 extends upwardly into open bore 60 of block 59, ending at its upper extremity in a sleeve 62, which is positioned midway between coils 53 and 54 when fingers 20 are depressed to their inmost position. Sleeves 62 and 61 are formed as integral extensions of plunger 47 and rod 46, respectively, and are constructed of a magnetic material of sufficient permeability to have a substantial effect upon the inductance of coils 53 and 54, and 51 and 52, respectively, when they are actuated by an alternating current. Helical spring 63 is placed around rod 46 in such position that it tends to force apart magnetic sleeves 61 and 62 and is under some compression when 61 and 62 are farthest apart.

Retaining ring 66 and retaining sleeve 67 are placed at opposite ends of block 59 within housing 2 in order to insure firm positioning of insulating block 59 with respect to the other parts of the caliper. Sleeve 64 is placed within sleeve 67 to provide insulation for the interior wiring, later discussed. Hole 65 may be provided through housing 2 and sleeves 64 and 67 to permit hydrostatic pressure in the caliper to be equalized with that in the conduit. The space inside of sleeve 64 may be filled with a semi-solid substance such as electrical filler compound.

At the upper extremity of caliper 1 is located end plug 68 which fits into the end of housing 2. End plug 68 is provided with tapped holes 69 and is firmly positioned in the caliper housing by means of screws 70, which engage end plug 68 through holes 71 in housing 2 and holes 69. End cap 68 is further provided with an axial bore 72 through which electric conductor and supporting cable 73 is passed to the instrument. Plug 68 is further provided with circumferential groove 74 in which is positioned spring steel retaining ring 75, which acts as a protective bumper, particularly when the case 2 is made of a soft material.

Cable 73 is brought into tight mechanical connection by plug 76, made of a suitable insulating material, which is provided with a tapered lower end designed to fit into hole 72, which is tapered outwardly at its upper extremity. Plug 76 is forced into an extremely tight fit with cable 73 and end plug 68 by means of retaining cap 77, which is securely connected to end plug 68 by a threaded connection 78. Cable 73 is preferably a 5-conductor cable in which the central conductor is a common lead 79 made of 7 strand, 19 wire steel cable. The common lead 79 is connected in parallel to one lead each of coils 51, 52, 53, and 54; the other leads of such coils are each independently brought out respectively through conductors 80, 81, 82 and 83, which are the remaining 4 conductors of cable 73. Cable 73 may be further secured and prevented from slipping from the caliper by means of a clamp 84 fastened just below end plug 68.

Figure 9 is illustrative of one method by which the measurements of caliper 1 may be indicated conveniently by a voltmeter having a scale calibrated to correspond with the position of the fingers 20. Coils 53 and 54 are connected in series to form half of an impedance bridge circuit in which the balancing impedances are 86 and 87, respectively. Volt meter 90 is connected across the bridge in parallel with coils 53 and 54 and with balancing impedances 86 and 87. Compensating or calibrating impedance 84 may be inserted in line 82 or 83 to compensate for unbalance in coils 53 and 54 or to provide an unbalance between such coils as a reference voltage. The conductor 79 leads to one pole of double-pole single-throw switch 92, the other pole being connected to impedances 86 and 87. Coils 51 and 52 are similarly connected to a second impedance bridge, compensating or calibrating impedance 85 being in line 80 or 81 as required. The balancing impedances 88 and 89 are connected in parallel with coils 51 and 52 and in parallel with voltmeter 91. The second impedance bridge is connected in parallel with the first bridge to the double pole single throw switch 92. Adjustable resistances 56 and 57 may be inserted in series with meters 90 and 91 to compensate for meter variations such as those which occur in rectifier type voltmeters with changes in temperature. During operation, these resistances are adjusted to produce definite maximum meter readings when the fingers 20 are in their outmost positions. Switch 92 conveniently connects the metering circuits to a source of constant voltage alternating current such as the output of a constant voltage transformer 93 which is connected to an alternating current supply, as for example, 110 volts A. C.

Figure 9 merely presents the metering circuits in simplified form. The exact circuits used would be determined by the size of the caliper, the voltage sources available, and are well within the knowledge of a person skilled in the art. So also, a description is not made of the details of winding coils 51, 52, 53 and 54; that is, their dimensions are equally variable and are within the knowledge of a person skilled in the art. I again make reference to my Patent No. 2,235,533 wherein the data for calculating the size of the coils and the requirements of a typical impedance bridge are given.

It should be noted that a simplified embodiment of my invention could include only a pair of coils within the caliper, one associated with the measurement of the least depressed fingers and the second such coil associated with the measurement of the most depressed fingers. In such a case the balancing coils would be fixed inductances and would be associated with their respective impedance bridges located without the caliper.

In operation, caliper 1 is passed through a conduit, such as a vertical oil well casing, the size of a caliper being determined by the size of the oil well casing to be measured. If it is desired to measure a horizontal or slightly inclined tube, end cap 33 should be replaced with end cap 97, later described with the embodiment of my invention illustrated by Figures 10 and 11. As the caliper passes down through the casing, the depth of the caliper is, of course, determined by the length of cable which is passed out. The three most depressed fingers 20 will be equally depressed, due to the action of coil spring 48, and will bear against disc 45 causing plunger 47 to position sleeve 62 between coils 54 and 53, such position causing the inductances of coils 53 and 54 to determined the balance of the bridge associated with those coils, any change being indicated on volt meter 90. Also, the least depressed finger 20 will bear against disc 44, which by rod 46 will position sleeve 61 between coils 51 and 52. The position of sleeve 61 will similarly cause an unbalance or change in balance in the impedance bridge associated with coils 51 and 52 which will be indicated by volt meter 91. Helical coil spring 63 causes the separation of sleeve 62 and 61 and, hence, forces annular disk 44 to bear against the surface 25 of that finger 20 which is the least depressed. Thus, spring 63 must always be weak enough so that it will not overcome the tension on the least depressed finger caused by its associated spring 27. In practice this provision is made by selecting a spring 27 sufficiently strong to overcome the effect of spring 63.

Thus, it is possible to have a continuous voltage indication of the maximum and minimum internal transverse dimensions of the conduit as the caliper is passed through the conduit. Conveniently, this voltage indication may be recorded on a moving sheet of paper which is calibrated in accordance with the amount of cable 73 which is passed through the conduit being measured. It is also possible to employ only one voltmeter or recording device which may switch from one impedance bridge to the other and still provide a sufficiently continuous indication of the measurements in each circuit.

Figures 10 and 11 illustrate a second embodiment which is adapted to the measurement of maximum internal transverse measurements only, and is useful when the significance of the minimum internal transverse dimension does not warrant the additional cost of providing it. This embodiment of my invention differs from that embodiment illustrated by Figures 1–9 in that a single pair of solenoids are actuated by a single sleeve of a magnetic material which moves in response to the radial movement of the least depressed caliper fingers. Only one associated impedance bridge therefore is employed, but in all other respects the caliper is substantially identical with that shown in the prior embodiment. Certain minor changes have been made to show possible variations. In all cases where the reference numerals employed in Figures 10 and 11 are the same reference numerals as those employed in Figures 1–9 with the addition of the superscript 1, they indicate that such part is substantially identical with the same part in Figures 1–9 indicated by such reference numeral. Where, however, a new reference numeral is employed, the part differs from that in the prior embodiment.

Particularly, end cap 33 has been replaced with new end cap 97 which is adapted by means of a shackle 98 to be pulled through the tube or conduit. In this respect end cap 97 is particularly useful when a horizontal or slightly inclined tube is to be measured, whereas end cap 33 is more useful in calipering vertical or sharply inclined tubes. A steel ring 96 is placed about the circumference of end cap 97 to act as a protective bumper. Finger housing 3 has been replaced by finger housing 94, which differs from finger housing 3 in that it contains no solid annular section 14, in that the bores 13 and 16 are continuous, and in that the ends are tapped at 102 and 106. A different method for adjusting the tension on the free ends 43' of springs 27' is employed. Plug 95, which engages part 94 in its tapped section 102, serves to adjust the tension on all of springs 27' simultaneously. Plug 95 is also provided with axial bore 103 which facilitates removal of dirt and grime from the center of the caliper by, for example, blowing compressed air through hole 103.

The caliper fingers actuate annular disks 44' and 45' as in the prior embodiment. Helical coil springs 48' serves to center the caliper within the circle determined by the three most depressed fingers, as before, but plunger 47 is replaced with plunger 104 which has no associated magnetic sleeve. Disk 44', as before, actuates rod 46' to move magnetic sleeve 61' between the coils 51' and 52'. Helical coil spring 63', as before, acts to separate sleeve 61' from plunger 104. As a variation, part 94 is tapped at 106 and annular disk 49 with its retaining clip 50 is replaced with threaded plug 99 which fits within tapped end 106 of 94, thereby serving to compress spring 48' and at the same time act as a guide for plunger 104 and rod 46'.

Casing 2 is replaced with casing 105 which is considerably shorter but otherwise quite like casing 2. Casing 105 is provided with an open tapped end 107 suitable to receive a 3-wire electrical plug through which leads 79', 80', and 81' pass to the outside meter box.

In operation, the embodiment of my invention shown in Figures 10 and 11 does not differ radically from that of the prior embodiment. The caliper is drawn through the tube or conduit by means of a cable or rope, for example, attached to the shackle 98. The caliper is positioned centrally within the tube with respect to the three most depressed fingers by the action of coil spring 48'. However, the meter box provides an indication responsive only to the movement of a least depressed finger as determined by the position of magnetic sleeve 61' with respect to coils 51' and 52'. Such information is generally useful in determining the thickness of the wall of the conduit through which the caliper is passed when the outside diameter of such conduit is known.

My invention is capable of many other variations which will readily occur to the person skilled in the art. One particularly useful variation comprises a caliper, such as that illustrated in Figures 10 and 11, and which, however, would be equipped with vertical end cap 33 in place of horizontal cap 97 and would further have coil 52 relocated within the meter box as a fixed inductance. Such an adaptation would be particularly useful in calipering oil well casings at extreme depths such as at 10,000 feet or more where the 5 conductor cable required by the embodiment of my invention shown in Figures 1–9 would be extremely heavy and costly. In this variation only an inexpensive and lightweight 2-conductor cable would be required.

I claim:

1. A tube caliper of the type described comprising an elongated cylindrical measuring head adapted for introduction into and passage through a tube to be measured, at least four movable caliper fingers pivotally mounted on said measuring head, each finger being independently movable in a direction substantially radial with respect to the measuring head and being pivoted at arcuate intervals about the surface of the measuring head, an arm on each movable finger extending inwardly from the pivotal connection thereof to the measuring head, springing means independently urging each movable finger outwardly from the measuring head into contact with the inner wall of the tube through which the caliper is to be passed, a first open-centered solenoid coil coaxially positioned within said measuring head, a second open-centered solenoid coil coaxially positioned within the measuring head between the first coil and the inwardly extended arms of said movable fingers, a rod coaxially positioned within said measuring head and longitudinally slidable therein, said rod terminating at one end within the open-center of the first solenoid coil and terminating at its other end on the opposite side of the inwardly extending arms of said movable fingers, an elongated hollow plunger coaxially positioned within said measuring head about said rod and longitudinally slidable thereover, said plunger terminating at one end within the open-center of said second solenoid coil and terminating at its other end between said second coil and the inwardly extending arms of said movable fingers, a sleeve of magnetic material affixed to the end of said rod terminating within the open-center of the first solenoid coil, a second sleeve of magnetic material affixed to the end of said plunger terminating within the second solenoid coil, a disk affixed to the rod at its other end, an annular disk affixed to said plunger at its other end, springing means positioned about said rod between, and bearing against each of, said magnetic sleeves, whereby the rod and the plunger are urged to slide longitudinally within the measuring head in opposite directions to cause said disks to enclose the inwardly extending arms of said movable fingers from opposite sides, and springing means bearing against inward motion of the fingers so as to cause the three most depressed fingers to be equally depressed.

2. A tube caliper of the type described comprising an elongated cylindrical measuring head adapted for introduction into and passage through a tube to be measured, at least four movable caliper fingers positioned lengthwise along said measuring head and pivotally mounted thereon, each finger being independently movable in a direction substantially radial with respect to the measuring head, said fingers being pivoted at adjacent ends thereof at arcuate intervals about the surface of the measuring head, an arm on each movable finger extending inwardly from the pivotal connection thereof to the measuring head, springing means independently urging each movable finger outwardly from the measuring head into contact with the inner wall of the tube through which the caliper is to be passed, a first open-centered solenoid coil coaxially positioned within said measuring head on the side of said inwardly extending arms opposite the caliper fingers, a second open-centered solenoid coil coaxially positioned within the measuring head between the first coil and the inwardly extended arms of said movable fingers, a rod coaxially positioned within said measuring head and longitudinally slidable therein, said rod terminating at one end within the open center of the first solenoid coil and terminating at its other end on the opposite side of the inwardly extending arms of said movable fingers, an elongated hollow plunger coaxially positioned within said measuring head about said rod and longitudinally slidable thereover, said plunger terminating at one end within the open-center of said second solenoid coil and terminating at its other end between said second coil and the inwardly extending arms of said movable fingers, a sleeve of magnetic material affixed to the end of said rod terminating within the open-center of the first solenoid coil, a second sleeve of magnetic material affixed to the end of said plunger terminating within the second solenoid coil, a disk affixed to the rod at its other end, an annular disk affixed to said plunger at its other end, springing means positioned about said rod between, and bearing against each of, said magnetic sleeves, whereby the rod and the plunger are urged to slide longitudinally within the measuring head in opposite directions to cause said disks to enclose the inwardly extending arms of said movable fingers from opposite sides, and springing means positioned about said plunger urging said annular disk to bear against the inwardly extending arms of said movable fingers and cause the three most depressed fingers to be equally depressed.

3. The tube caliper of claim 2 in which said first and second solenoids each comprise a pair of longitudinally adjacent windings.

References Cited in the file of this patent

UNITED STATES PATENTS

| Number | Name | Date |
|---|---|---|
| 2,121,614 | Stark | June 21, 1938 |
| 2,122,664 | Terry | July 5, 1938 |
| 2,235,533 | Roberts | Mar. 18, 1941 |
| 2,322,343 | Brandon | June 22, 1943 |
| 2,439,595 | Cooke | Apr. 13, 1948 |
| 2,518,663 | Chaney et al. | Aug. 15, 1950 |
| 2,596,924 | Fredd | May 13, 1952 |
| 2,640,271 | Boucher | June 2, 1953 |